W B. LINN.
STRAW AND GRAIN SEPARATOR FOR THRESHERS.
APPLICATION FILED OCT. 1, 1917.
1,325,480.
Patented Dec. 16, 1919.
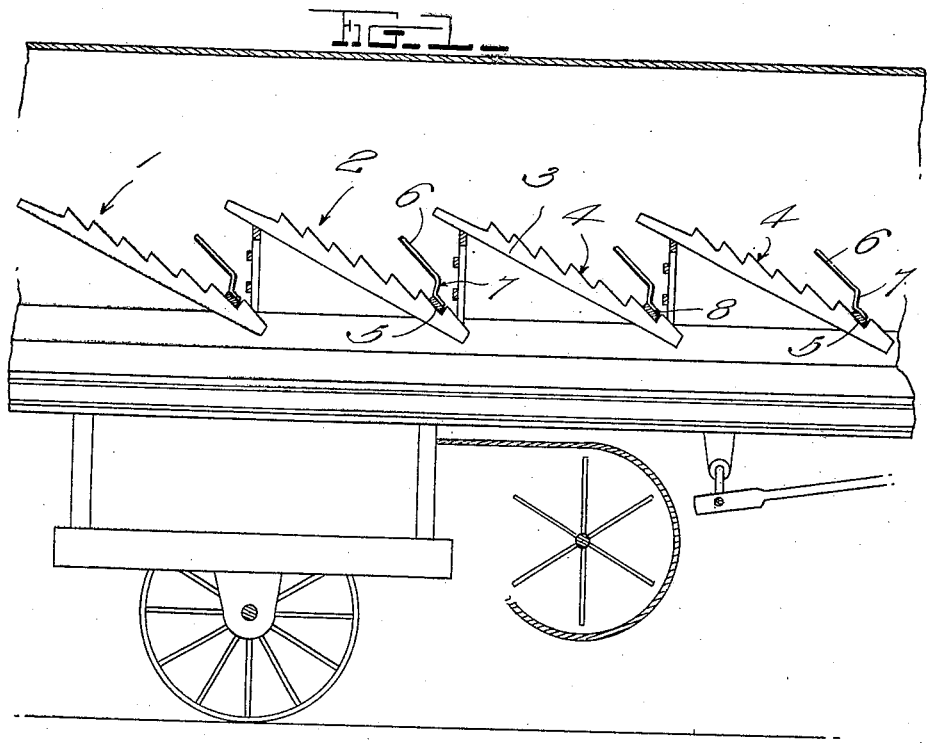
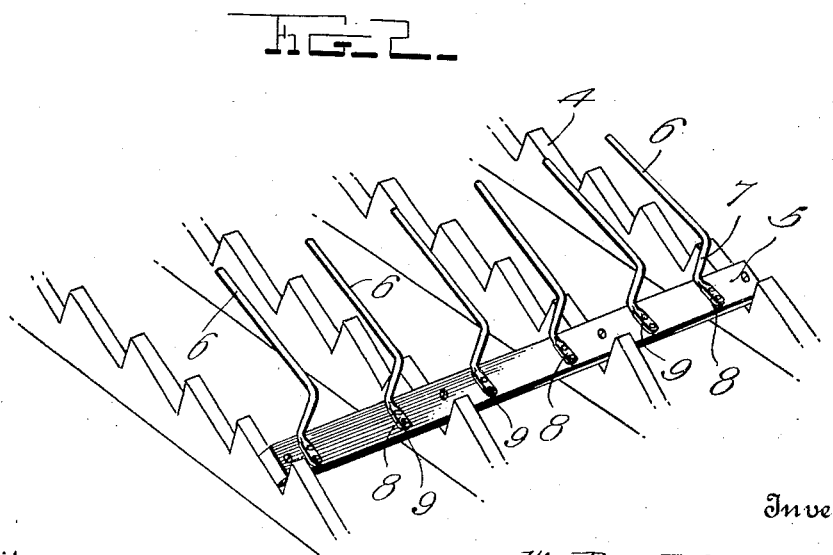

UNITED STATES PATENT OFFICE.

W BIRNEY LINN, OF CHICO, CALIFORNIA.

STRAW AND GRAIN SEPARATOR FOR THRESHERS.

1,325,480.  Specification of Letters Patent.  Patented Dec. 16, 1919.

Application filed October 1, 1917. Serial No. 194,236.

*To all whom it may concern:*

Be it known that I, W BIRNEY LINN, a citizen of the United States, residing at Chico, in the county of Butte and State of California, have invented certain new and useful Improvements in Straw and Grain Separators for Threshers; and I do declare the following to be a full, clear, and exact description of the invention, such as will enable others skilled in the art to which it appertains to make and use the same.

My invention relates to improvements in straw and grain separators, and more particularly to those of the reciprocating type commonly used within threshing machines, the principal object being to provide a simply constructed and inexpensive attachment for such separators, whereby the grain carried within the straw will be more readily separated therefrom, without the use of vertically oscillating beaters and the like.

With the foregoing general object in view, the invention resides in the novel features of construction and unique combination of parts to be hereinafter fully described and claimed, the descriptive matter being supplemented by the accompanying drawings which form a part of this specification and in which:—

Figure 1 is a longitudinal section of a portion of a threshing machine separator showing the application of the improved attachment and Fig. 2 is a perspective view of a portion of the straw rack and one transverse row of the separating tines secured thereto.

In the drawings above briefly described, the numeral 1 designates a common type of reciprocating straw rack, said rack including a plurality of inclined sections composed of inclined bars 3 having teeth 4 on their upper edges, the upper ends of the several sections being positioned above the lower ends of the next adjacent section. This type of separator has been in general use upon threshing machines, and further details need not be set forth except that it may be stated, that any preferred means may be employed for reciprocating the rack, so that the straw is gradually fed from one end thereof to the other, it being intended that the grain from said straw shall fall therefrom through the spaces between the bars 3 and into the usual grain pan. Experience has taught, however, that a considerable amount of grain is carried from the machine with the straw. To overcome this, numerous attachments have been devised, most of them including vertically oscillating fingers or beaters at the several "drops" of the straw rack, but the addition of such parts has required the expenditure of more power even though better results have been obtained. By the provision of the features of construction now to be described, no added power whatever is required in operating the machine, yet any grain within the straw is effectively separated therefrom as this straw drops from one section of the straw rack onto the next section.

Transverse bars 5 are secured to the lower teeth of the longitudinal bars 3, one of said bars 5 being carried by each section 2 of the straw rack as shown clearly in Fig. 1. Transverse rows of tines 6 are secured to the transverse bars 5, and inclined in substantially the same direction as the several sections 2 of the rack, the several tines being positioned so that they will receive thereon the straw, as the latter is passed on from each section of the rack to the next adjacent section. The result is that these tines will prevent massing of the straw, and in so loosening the straw, will insure that any grain carried therein will be freed so that it may drop onto the grain pan below.

Each tine 6 is preferably formed of a single piece of wire, the inner ends of said tines being bent downwardly as shown at 7 and then continued laterally at 8, the laterally extending portions being flattened and secured in place upon the bars 5 by screws or the like 9.

From the foregoing, taken in connection with the accompanying drawings, it will be obvious that although my invention is of extremely simple and inexpensive nature, it will be highly efficient and durable for the purpose intended. Since probably the best results are obtained from the specific features of construction shown and described, such features constitute the preferred form of the device, but I wish it understood that within the scope of the invention as claimed, numerous minor changes may well be made.

I claim:

In a grain and straw separator, a reciprocating straw rack including a pair of inclined sections consisting of toothed longitudinal bars, the upper ends of the bars of one section being disposed above and projecting over the lower ends of the bars of the other section, a transverse bar secured to the lower ends of the bars of one section under the projecting upper ends of the bars of the other section, and a plurality of tines secured at one end to said transverse bars, said tines extending upwardly from their anchored ends and then inclining in substantially the same direction as said rack sections, the free ends of said tines extending beyond the upper ends and the toothed bars above them to receive the straw from the latter, and said free tine ends being located substantially midway between the adjacent ends of the two rack sections.

In testimony whereof I have hereunto set my hand in the present of two subscribing witnesses.

W BIRNEY LINN.

Witnesses:
SAMUEL J. MUNN,
RUTH BAKER.